United States Patent [19]
Clarke et al.

[11] 3,765,903
[45] Oct. 16, 1973

[54] ISOMERISED HOP EXTRACT

[75] Inventors: Brian James Clarke, Bentleigh; Robert Peter Hildebrand, Mount Waverley; David George Lance, Greensborough; Alexander William White, Elsternwick, Victoria, all of Australia

[73] Assignee: Carton and United Breweries Limited, Carlton, Victoria, Australia

[22] Filed: Aug. 5, 1971

[21] Appl. No.: 169,549

[30] Foreign Application Priority Data
Sept. 17, 1970 Australia................................ 2573
June 24, 1971 Australia................................ 5303

[52] U.S. Cl. ................................................. 99/50.5
[51] Int. Cl. ............................................ C12c 9/02
[58] Field of Search............................... 99/50.5, 51

[56] References Cited
UNITED STATES PATENTS

| | | |
|---|---|---|
| 3,451,821 | 6/1969 | Todd et al. ........................ 99/50.5 |
| 3,607,300 | 9/1971 | Mitchell............................. 99/50.5 |
| 3,486,906 | 12/1969 | Todd.................................. 99/50.5 |
| 3,607,298 | 9/1971 | Mitchell et al...................... 99/50.5 |

FOREIGN PATENTS OR APPLICATIONS

| | | |
|---|---|---|
| 1,817,636 | 6/1970 | Germany ............................ 99/50.5 |

*Primary Examiner*—Lionel M. Shapiro
*Assistant Examiner*—R. B. Penland
*Attorney*—Eric H. Waters et al.

[57] ABSTRACT

A process for the preparation of an isomerised hop extract for use in the flavouring of food or beverages which comprises adding to a solution of humulones or their salts a metal ion of calcium, magnesium, nickel, manganese or zinc, which metal ion forms with the humulones a metal ion-humulone complex which then precipitates from the solution. The metal ion-humulone complex is then heated in solid or paste state or in suspension or dissolved in an organic solvent to form a metal ion-isohumulone complex in high yield. The metal ion-isohumulone complex is substantially insoluble and can be used as a bittering additive, without regeneration to a soluble salt of isohumulone, by finely grinding such metal ion-isohumulone complex.

10 Claims, No Drawings

ISOMERISED HOP EXTRACT

This invention relates to a new and improved process for the preparation of an isomerised hop extract or concentrate suitable for use in the flavouring of beverages, particularly beer.

The utilisation of the humulones or $\alpha$-acids (hereinafter referred to as "humulone" or "humulones") from the hop is a very important factor in the manufacture of beer and ale. When natural hops are used for hopping in the kettle the humulones are converted to their corresponding isohumulones or iso-$\alpha$-acids (hereinafter referred to as "isohumulone" or "isohumulones") which are soluble and provide the basic bitter flavour of the beer. However, the overall utilisation of the humulones as judged by the concentration of isohumulones in the finished beer varies between 25 and 35 percent.

The methods for the preparation of simple solvent extracts of the hop have been described in previously published patent specifications and the further extension to the preparation of a isomerised hop extract is described in our Australian Pat. No. 274051.

This invention describes a novel method of preparation of a concentrated or solid form of isomerised extract in which the isohumulones are prepared in close to stoichiometric yield as a metal ion-isohumulone complex in a more pure form than that obtained by any commercial process yet known and which can be added directly to unfiltered storage beer or filtered bright beer without significant haze formation. The increased yield on isomerisation and the higher level of utilisation on addition of the isomerised product to beer enables greater economy than was heretofore possible in the preparation and use of commercial isomerised hop extracts.

In addition the isomerised hop extract in the form of the metal ion-isohumulone complex is stable and resistant to degradation even under relatively extreme conditions.

Previously described methods for the preparation of isomerised extracts have involved (a) exposure of a solution containing humulones either alone or together with other extractibles from the hop to electromagnetic radiation or (b) the isomerisation of the sodium or potassium salts of the humulones with or without other alkali soluble components of the hop by submitting them to elevated temperature in an aqueous or aqueous alcoholic medium at a range of pHs, e.g., pH5 to pH10. In all these cases the nature of the process results in the formation of products other than isohumulones along with the isohumulones and usually necessitates some form of concentration and stabilisation of the isomerised product.

One advantage of the invention described herein compared with what was previously known is that the humulones may be isomerised whilst in the form of a solid metal ion-humulone complex in a concentrated form requiring no subsequent concentration step for transportation and storage nor any stabilisation. The concentration of the isohumulones in the complex as recovered is normally in the range 50 to 75 percent dry weight.

The invention is applicable to aqueous or other solvent extracts containing humulones. A metal ion-humulone complex which is substantially insoluble in water is formed from the humulone and a suitable metal ion. The process, subsequent to formation of a water-insoluble, metal ion-complex of the humulones, involves the isomerisation of this metal-ion complex of the humulones by heating the said complex, for example, (a) in the solid state as a powder or wet paste, or (b) in the solid state in suspension in water or other non reacting liquid at any concentration or (c) in solution in any concentration.

Any non-toxic liquid, such as water, in which the complex is insoluble or only sparingly soluble, may be used to form the suspension (e.g., 55 percent liquid) for isomerisation. Alternatively the dry powder may be brought to a satisfactory liquid content (e.g., 5 to 10 percent liquid) for isomerisation.

Any suitable liquid, such as ethanol or propylene glycol, in which the complex is soluble and which has no significant flavour effects or other effects on beer quality at the level of use, may be used as the solvent for the formation of a solution of the complex. The complex can be dissolved in the solvent at any concentration up to maximum solubility, e.g., approximately 45 percent w/w (weight of solute per weight of solution) in the case of ethanol.

The invention contemplates a method for the precipitation of the metal ion-humulone complex from a solution of the humulones in an organic solvent or one of their soluble salts, (e.g., the sodium or potassium salt), in water or dilute alkali. Suitable solvents for the humulones are those in which the metal ion-humulone complex is insoluble or sparingly soluble, e.g. hexane, iso-octane.

For example, the humulones may be precipitated as an insoluble metal ion-humulone complex by adding, either in the solid state or in solution, calcium or magnesium ions in the form of an ionic compound of the particular metal. Calcium and magnesium are the preferred cations but other suitable cations may be used. Other cations, which form an insoluble metal ion-humulone complex, which may be used to produce an essentially similar result are nickel, manganese and zinc. Implicit in the term "insoluble" is the understanding that the complex formed is insoluble in the liquid phase from which precipitation occurs but not in all liquids, e.g. ethanol.

The ionic compounds or salts of the metals preferably used are those containing anions which are non-toxic and have no significant effect on beer quality at the levels used, e.g., chlorides, sulphates, phosphates. A suitable solvent for the ionic compound is water, but any solvent in which the said compound is soluble and in which the metal ion-humulone complex is insoluble, or sparingly soluble, may be used.

The metal ion-humulone complex of the humulones may be precipitated in 95 to 100 percent yield provided the overall inorganic ion level is sufficient to salt out any dissolved metal ion-humulone complex. In the event that adjustment is needed, the ion level may be adjusted by known procedures, e.g., the addition of excess of the precipitating salt or of, for example sodium chloride to the medium. The amount of excess of the precipitating salt or of, for example, sodium chloride to be added will depend on the nature of the extract treated but in a typical case of the magnesium ion-humulone complex precipitating from an aqueous medium, for example, a stoichiometric amount of the precipitating salt would be added and then a sufficient excess of the precipitating salt, or of the added salt, for example sodium chloride, would be added so as to render the aqueous medium preferably at least 5 % w/v (weight of solute per volume of solution) with respect to the precipitating salt and/or the added salt.

Other compounds may be used to adjust the ion level, e.g., sodium sulphate, magnesium sulphate, magnesium chloride, or calcium chloride.

The insoluble metal ion-humulone complex can be simply recovered by established techniques (such as centrifugation) and in the simplest case may be filtered off, washed and dried to a convenient moisture or solvent content. The solid precipitate with or without preliminary drying is then submitted to heat at varying temperatures and for varying periods of time (depending on the precipitating ion and the moisture content) in order to effect the isomerisation. The time of heating decreases with increasing temperature, but in general may be as with the magnesium ion-humulone complex 10 to 15 minutes at approximately 100°C. The temperature of heating can be varied from 50°C to 140°C without any significant variation in the yield of isohumulones. The temperature and times quoted are dependent upon the particular ion used for complex formation, and on the physical dimensions and moisture content of the solid which is heated, both of which factors affect the rate of heat transfer within the reacting mass. It has been shown that in the case of metal ion-humulone complexes formed with some particular complex-forming ions other than magnesium (such as manganese), the solid can be isomerised at much lower temperatures, or alternatively in the case of complexes formed with still other precipitating ions (such as lead) can be heated for extended periods without any change occurring i.e., without isomerising.

In particular the following cations have been found to be effective in forming a solid metal ion-humulone complex which will undergo isomerisation in the solid state under the conditions of time and temperature set forth:

viz., nickel ion-humulone complex heated at 80°C to 140°C for 5 to 60 min.

manganese ion-humulone complex heated at 60°C to 140°C for 5 to 30 min.

zinc ion-humulone complex heated at 60°C to 140°C for 5 to 30 min. there being a time-temperature relationship in each case.

During heating of the solid magnesium ion-humulone complex, for example, at or above 100°C, the solid may fuse while the isomerisation proceeds and, if the reaction mixture is allowed to cool in this form, may set to a glassy solid metal-containing metal ion-humulone complex in almost stoichiometric yield and this glassy solid may be milled to a powder. Alternatively, the solid metal ion-humulone complex may be heated and cooled under conditions such that the solid retains its particulate form.

Alternatively the isomerisation may be performed subsequent to solution of the metal ion-humulone complex in ethanol, propylene glycol or other suitable solvent at varying concentrations, but typically 30 to 80 percent, or after suspension of the metal ion-humulone complex in water or any other non reactive liquid medium in which the metal ion-humulone complex is substantially insoluble.

The metal ion-humulone complex and metal ion-isohumulone complex can be stored for extended periods without substantial deterioration under normal conditions of temperature and atmosphere in both the solid state, wet or dry, and in solution in ethanol, propylene glycol or other suitable solvent or as a fine disperse powder in a suitable suspending medium.

The metal ion-isohumulone complex can be readily dissolved in a solvent such as ethanol or propylene glycol prior to addition to beer, or the said complex can easily be converted to a more soluble form, e.g. the sodium or potassium salt, by any of a variety of established techniques. Such techniques include intimate mixing of a solution of the complex with excess of a concentrated solution of sodium or potassium hydroxide or carbonate. The sodium or potassium salt so formed can be immediately dosed into beer, or can be filtered to remove the precipitated metal salts and then dosed into beer, or can be stabilised with a suitable antioxidant and/or emulsifying agent with or without prior filtration and then stored in this form for future use.

An alternative final treatment of the metal ion-isohumulone complex which results in a novel product, is the conversion of the complex or any of its derivatives into a finely ground powder which can be used as such or in the form of a stable suspension (with or without the inclusion of a protective colloid).

For example, the solid metal ion-isohumulone complex after preliminary coarse grinding is slurried in water or other suitable suspending medium at a concentration (e.g., 45 percent solid w/w) suitable for grinding in a mill (e.g., a vibrating ball mill) which will reduce the particle size to a value, for example, of less than 10 microns and, preferably, less than 2 microns, which will dissolve readily in the beverage to be flavoured. The resulting suspension (which may include an acceptable protective colloid) is stable chemically and physically for an extended period and may be metered directly, or after dilution with water, or other acceptable diluents, into the beverage to give rapid dispersion and solution as well as excellent utilisation of the contained isohumulones. The following illustrate the invention.

EXAMPLE 1

Precipitation from Hexane

A solution of an extract of hops (10.0 g; 42.6 percent humulones) in hexane (100 ml) was stirred very vigorously with an aqueous solution of magnesium sulphate heptahydrate (2M; 5 ml), and an aqueous potassium carbonate solution (10% w/v; 17.5 ml) was added dropwise over one hour. The mixture was then filtered, and the solid thus obtained was washed thoroughly on the filter with hexane. After drying in a vacuum dessicator at room temperature, a free flowing greenish-yellow coloured powder was obtained (5.77 g; 71.5% w/w humulones; 96.8 percent recovery).

EXAMPLE 2

Precipitation from an Aqueous Solution of the Potassium Salt

An aqueuos solution of the potassium salts of humulones (1791; 1.10 percent humulones; prepared by countercurrent extraction of a hexane solution of an extract of hops with 0.05M aqueous potassium carbonate solution) was gently agitated, and magnesium sulphate heptahydrate (1.25 kg) was added. After 15 minutes, sodium chloride (13.5 kg) was added, and agitation was continued for a further 30 minutes. The mixture was then filtered, yielding a damp filter cake which was freeze-dried to a bright yellow powder (3.36 kg; 55.6% humulones, 94.9 percent recovery).

EXAMPLE 3

Isomerisation in Ethanol

Magnesium ion-humulone complex (1.04 g; 78.0 percent humulones; prepared in a manner similar to that described in Example 2, was dissolved in 90 percent ethanol (10 ml) and boiled under reflux for 25 minutes. After cooling, this concentrated solution was analysed by countercurrent distribution and found to contain isohumulones (0.743 g, 91.6 percent yield).

EXAMPLE 4

Isomerisation in the Solid State

Magnesium ion-humulone complex (1.53 g; 49.7% humulones; prepared as described in Example 2, but pressed dry rather than freeze-dried) was heated in a loosely stoppered tube at 110°C. for 10 minutes. After cooling, the solid complex was analysed by countercurret distribution and found to contain isohumulones (804 g; 97.6% yield).

EXAMPLE 5

Use of Different Metal Ions for Precipitation

An aquous solution of the potassium salts of humulones (10.0 l, 1.10 percent humulones, prepared by countercurrent extraction of a hexane solution of a commercial hop extract with 0.05 M aqueous potassium carbonate solution) was gently agitated, and nickel sulphate hexahydrate (81.0 g) was added. After 10 minutes, sodium chloride (750 g) was added and agitation continued for a further 15 minutes. The mixture was filtered to yield a damp filter cake of the metal ion-humulone complex which was isomerised as described in Example 4.

The above procedure was repeated replacing the nickel sulphate hexahydrate with (a) zinc sulphate heptahydrate (b) manganous sulphate tetrahydrate and (c) calcium chloride.* The recovery of humulones obtained on precipitation and isohumulone on isomerisation is indicated in the following table.

| Cation used for precipitation | humulones yield on precipitation (%) (polarimetric analysis) | isohumulone yield on isomerisation (%) (spectrophotometric analysis) |
| --- | --- | --- |
| Nickel | 100.0 | 97.5 |
| Zinc | 99.2 | 92.7 |
| Manganese | 98.2 | 81.0 |
| Calcium | 97.5 | 99.5 |

* In the case of calcium ion-humulone complex isomerisation was carried out at 110°C. for 1 hour.

EXAMPLE 6

Solid magnesium ion-isohumulone complex, prepared as described in Example 4 was coarsely ground through a conventional screw-type meat mincer. A weighed amount (100 g dry weight) of this material (59.4 percent w/w isohumulones) was mixed with an aqueous solution (150 g) of hydroxypropylcellulose (1.7% w/w). The resulting suspension was added to a suitably sized ball mill, and ground until a maximum particle size of 5 microns and an average particle size of 1-2 microns was obtained. The material was recovered from the mill as a thixotropic, concentrated dispersion (23.6% w/w isohumulones; 99.4 percent recovery).

On addition of unfiltered, unhopped storage beers at a level of 25.0 ppm. either as the concentrate, or after dilution with water to ≈1 percent isohumulones content, increases in analysed isohumulones content in the beer of 23.9 to 25.4 ppm (95.6–101.7 percent utilisation) were obtained.

We claim:

1. A method of preparing an isomerised hop extract for use in the flavouring of food or beverages, which comprises, adding to a solution of humulons or their salts in water or an organic solvent, a metal ion selected from the group consisting of calcium, magnesium, nickel, manganese and zinc, which metal ion forms with the humulones an insoluble metal ion-humulone complex which is precipitated from the said solution, and heating the thus precipitated metal ion-humulone complex in the solid state at an isomerisation temperature between 50°C and 140°C to for an ssohumuline complex of said metal ion.

2. The method of claim 1 wherein the isomerisation is carried out by heating the metal ion-humulone complex in the presence of at least 5 percent by weight of water.

3. The method of claim 1 comprising adjusting the ion level of the solution from which the insoluble metal ion-humulone complex is to be precipitated by the addition of a soluble ionic compound or salt to improve the yield of precipitated metal ionhumulone complex.

4. The method of claim 1 wherein the humulone solution is in the form of an aqueous solution of a salt of the humulone and the metal ion is in an aqueous solution of a salt of the said metal ion.

5. The method of claim 1 wherein the said humulone or salts are in solution in an organic solvent, the metal ion being in an aqueous alkaline solution of a salt of the said metal ion.

6. The method of claim 1 comprising reducing the particles size of the said metal ion-isohumulone complex to a size which enables direct addition of the said complex in the form of a liquid suspension or slurry to the beverage to be flavoured and results in a rapid dissolution of the said complex in the beverage.

7. The method of claim 6 wherein the metal ion-isohumulone complex is ground to a particle size of less than 10 microns.

8. The method of preparing an isohumulone containing hop extract for use in the flavouring of food or beverages which comprises adding to a solution of humulones or their salts in water or an organic solvent, a metal ion selected from the group consisting of calcium magnesium, nickel, manganese and zinc, which metal ion forms with the humulones an insoluble metal ion-humulone complex which is precipitated from the said solution, dissolving the said precipitated metal ion-humulone complex in an organic solvent, and heating the said solution of the metal ion-humulone complex in said organic solvent at an isomerisation temperature between 50°C and 140°C to form a metal ion-isohumulone complex in solution.

9. The method of claim 8 wherein said solvent is ethanol or propylene glycol.

10. The method of claim 8 comprising adjusting the ion level of the solution from which the insoluble metal ion-humulone complex is to be precipitated by the addition of a soluble ionic compound or salt to improve the yield of precipitated metal ion-humulone complex.

* * * * *